United States Patent [19]

Hebert et al.

[11] Patent Number: 5,149,562

[45] Date of Patent: Sep. 22, 1992

[54] PRODUCT AND PROCESS OF COATING NUTS WITH EDIBLE PROTEIN

[75] Inventors: Gerald D. Hebert, Hopatcong; Oris E. Holloway, Sparta, both of N.J.

[73] Assignee: Nabisco, Inc., Parsippany, N.J.

[21] Appl. No.: 546,539

[22] Filed: Jun. 28, 1990

[51] Int. Cl.[5] ............................ A23L 1/36; A23B 9/14
[52] U.S. Cl. ..................................... 426/632; 426/290; 426/291; 426/293; 426/302; 426/303; 426/576
[58] Field of Search ............... 426/290, 291, 293, 302, 426/303, 632, 576

[56] References Cited

U.S. PATENT DOCUMENTS

| | | | |
|---|---|---|---|
| 1,602,826 | 10/1926 | Kuhn | 426/293 |
| 3,314,800 | 4/1967 | Noznick et al. | 426/632 |
| 4,161,545 | 7/1979 | Green et al. | 426/93 |
| 4,329,375 | 4/1982 | Holloway, Jr. et al. | 426/632 |
| 4,501,758 | 2/1985 | Morris | 426/293 |
| 4,769,248 | 9/1988 | Wilkins et al. | 426/293 |

Primary Examiner—Jeanette Hunter
Assistant Examiner—Helen Pratt

[57] ABSTRACT

This invention relates to a process for preparing oil roasted nuts. The process comprises roasting nuts, applying at least one uniform coating of an edible protein to the roasted nuts, and applying a coating of a seasoning mix to the coated nuts. The invention further relates to the nuts produced thereby. The process of this invention produces nuts exhibiting increased uniformity of coating, improved flavor, enhanced coating adhesion and reduced clumping and sticking.

21 Claims, 1 Drawing Sheet

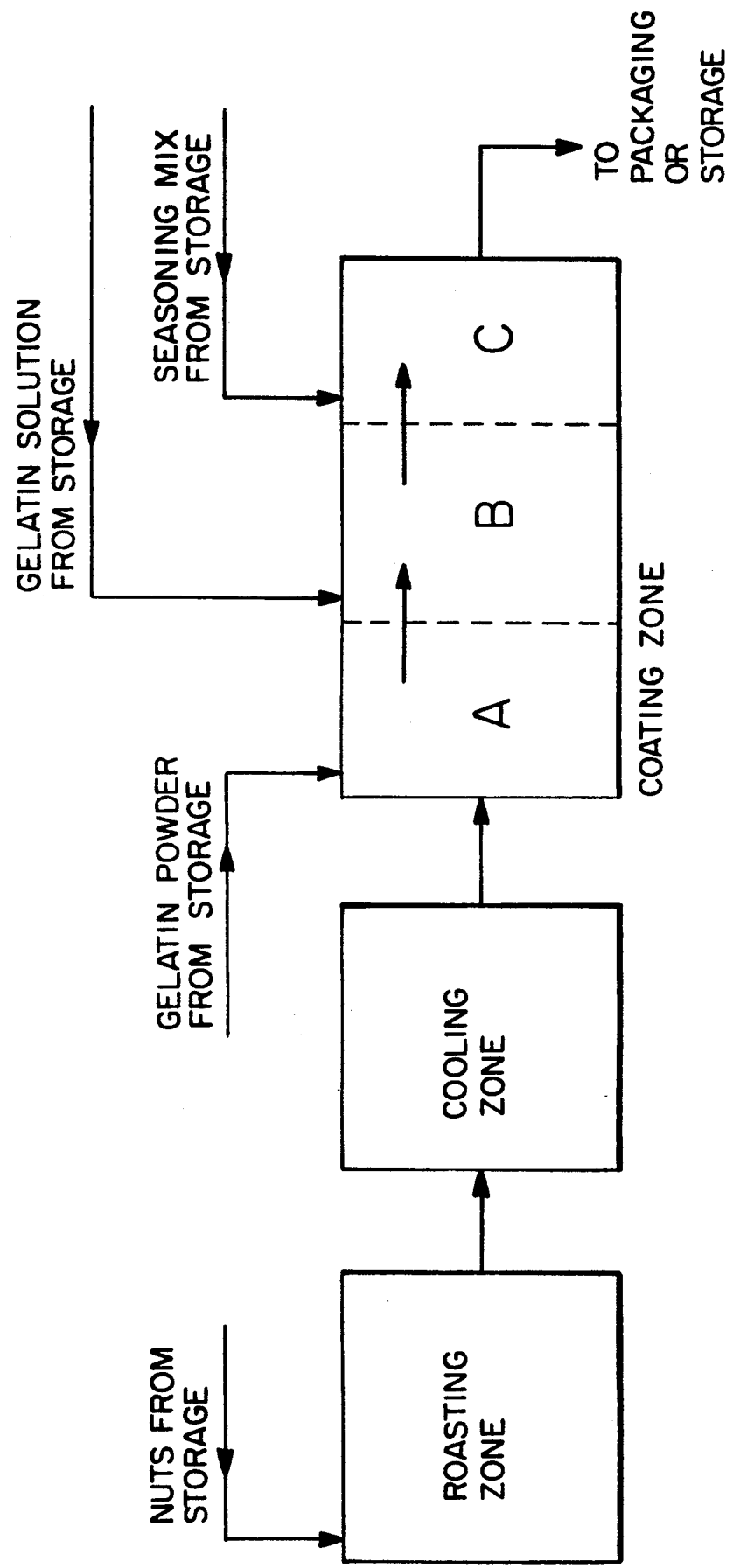

PRODUCT AND PROCESS OF COATING NUTS WITH EDIBLE PROTEIN

BACKGROUND OF THE INVENTION

This invention relates to coated, oil roasted nuts. More particularly, this invention relates to a process for preparing coated, oil-roasted nuts which exhibit superior coating adhesion and uniformity, and the nuts produced thereby.

U.S. Pat. No. 3,314,800 to Noznick et al. attempted to overcome the problem of poor salt adherence to dry roasted nuts by first dry roasting nuts and then applying a coating of wheat gluten to the nuts while still hot. Noznick et al. further suggests the application of gluten and salt in a single wet phase. The method of this patent has several drawbacks, including the limiting requirement of dry roasting, the undesirable requirement of coating the nuts while still hot and the limited number of seasonings which can be combined with gluten in a single wet phase.

Green et al, in U.S. Pat. No. 4,161,545, discloses a method for adhering a dry coating prior to roasting by first coating nuts with a honey solution and then the dry coating. Green et al. also recommends the use of an additional adhesive agent such as malto-dextrin, dextrins, edible polymers, gum arabic, guar and cellulose derivatives in combination with the honey solution.

U.S. Pat. No. 4,501,758 to Morris relates to the use of an aqueous mixture of sugar and one of gum arabic, gum acacia, guar, xanthan, corn syrup solids, dextrine, or mixtures thereof as an adhesive for a sugar/starch/dried honey mixture applied prior to roasting.

In U.S. Pat. No. 4,769,248, Wilkins et al. teach the application of a starch pre-dust, a coating of a gelatin solution, and then a coating of a seasoning mix prior to dry roasting the nuts. The resulting nuts exhibit superior coating adherence.

Unfortunately, the use of such prior art binders which involve coating before roasting results in a substantial amount of coating loss which occurs during the coating, roasting, cooling, packaging and storage processes, or both. This coating loss often causes the product to take on an unattractive speckled appearance and is disadvantageous in terms of waste.

More importantly, though, since many spices and other flavoring agents can be adversely affected by heat, coating before roasting severely limits the spices and flavorings available. Coating after roasting, especially when the nuts are oil-roasted, can be difficult since oil roasted nuts generally have a thin film of oil on their surface, significantly interfering with the adhesion of coatings.

It has now been found, surprisingly, that use of one or more coatings of an edible protein after oil roasting can provide superior adhesiveness for subsequent dry coatings.

SUMMARY OF THE INVENTION

This invention relates to a process for producing roasted nuts and the nuts produced thereby. More particularly, this invention relates to a process wherein raw nuts are first oil roasted and then coated with an edible protein. The protein-coated nuts are then coated with a seasoning mix.

The use of coating(s) of edible protein has been found to increase the adhesion of subsequent coatings to the nuts, even if the nuts have been oil roasted.

DESCRIPTION OF THE DRAWINGS

This invention will be better understood and its advantages will become more apparent from the following detailed description, especially when read in light of the attached drawing, which is a flowsheet schematically illustrating one embodiment of the process of the invention.

DETAILED DESCRIPTION OF THE INVENTION

The nuts which are treated in accordance with this invention can be any edible nuts which are conventionally packaged and sold as snack-type products or which are utilized for decoration or as fillers in the confectionery and baked foods industries. Illustrative of such nuts are peanuts, cashews, almonds, walnuts, filberts, macadamia nuts, pecans, and the like. Particularly preferred are peanuts and cashews.

The nuts are deshelled in a preliminary step and, optionally, may also be subjected to other conventional procedures such as blanching prior to being subjected to the process of the invention. The term "raw nuts" is used hereinafter to refer to nuts in the form in which they are subjected to the first step of the process of the invention irrespective of any preliminary treatment which has been applied to the nuts. Thus, white-roasted nuts and nuts which have been subjected to a process to remove a portion of their fat content are included within the meaning of this term.

In an initial step of the inventive process, the nuts are subjected to roasting using procedures which may vary depending upon the particular type of raw nut which is being processed. Typically, the nuts are roasted in an edible oil such as refined peanut oil at a temperature which can vary from about 240° F. to about 350° F., and which is preferably in the range of about 300° F. to about 330° F., more preferably from about 315° F. to about 325° F.; and for a time which will vary depending upon the particular type of nut being processed and upon the temperature of roasting and the degree of roasting desired. Illustratively, the time and extent of roasting will be greater in the case of peanuts (from about 4.5 to about 7 minutes) than in the case of cashews (from about 1.5 to about 3.5 minutes). The most appropriate roasting condition to be adopted in any particular instance can be determined readily by a process of trial and error.

The roasting operation can be conducted on a batch or continuous basis. In the case of a continuous oil roasting operation the nuts are retained on a continuous web of wire mesh fabricated from stainless steel or the like and transported on a continuous basis through a bath of the edible oil heated to a temperature within the range set forth above. The residence time of the nuts in the bath is adjusted to provide the desired time of roasting. The roasted nuts, whether roasted on a continuous or batch basis, are then passed to the coating stages of the process of the invention. Preferably, any excess oil remaining on the nuts after the roasting step has been completed is allowed to drain off before subjecting the roasted nuts to the coating stages.

After the nuts have been roasted in the manner described above, they are subjected to a coating operation in which at least one coating of an edible protein is applied. This coating can be applied using conventional coating means and conditions effective for uniformly coating the nuts. Advantageously, the coating is accomplished in a conventional coating drum. The nuts are introduced into the drum and an appropriate amount of edible protein is introduced while providing agitation by rotating the drum until the nuts are uniformly coated with a layer of the protein. Preferably, particularly when this process is being performed on a continuous basis as described more fully below, the nuts and edible protein are introduced into the drum simultaneously in the appropriate proportions, and rotation of the drum is carried out as before until uniform coating is achieved.

By edible protein is meant any edible legume or animal-derived proteinaceous material useful for forming an adherent coating on roasted nuts. Included among the proteins which can be used to coat nuts in the process of the present invention are egg albumin, gelatin, soy protein, including modified soy protein such as food grade, enzyme modified soy protein commercially available from A. E. Staley Mfg. Co. of Decatur, Ill. as Versa Whip TM whipping protein.

Advantageously, the edible protein is prepared as a solution or mixture of about 5% to about 9% protein, typically in water. More preferably, the solution is a solution of about 6% to about 8% and, most preferably, about 7% edible protein. Preparation of the protein solution may be by conventional means known in the art. For instance, gelatin, such as an edible beefskin gelatin, is combined with water which has been heated to a temperature of about 160° F. to about 180° F., preferably about 170° F., and mixed until complete solution is achieved.

Where the edible protein is applied as a dry powder, the nuts are preferably then sprayed with a minor amount (about 3% to about 7% by weight of the nuts) of water or other liquid in order to create tackiness and promote adhesion by the protein coating. More preferably, where the edible coating is applied as a dry powder, the nuts are then coated with a coating of an edible protein in solution or mixture, in order to promote adhesion of subsequent coatings.

One of the distinguishing features of the process of this invention lies in the use of the edible protein. Surprisingly, it has been found that the edible protein of the present invention provide substantially greater adhesion of any subsequently-applied dry coatings and leads to a roasted nut exhibiting superior uniformity of coating, even where the nuts have previously been oil roasted. Although the exact mechanism is unclear, it is believed that the protein absorbs much of the oil from the surface of the nuts, thereby providing the nuts with a surface to which a subsequent dry coating will readily adhere. Such a tacky surface provides the increased adhesion exhibited by the nuts of this invention.

Preferably, each coating of the edible protein is applied to the nuts at a rate of about 2.0 to about 4.5 parts by weight of edible protein or solution thereof per 100 parts by weight of nuts.

After the nuts have been uniformly coated with edible protein as described above, they are subjected to a further coating operation in which a dry coating of a seasoning mix is applied. This coating can be applied using conventional means such as described above and can be carried out immediately after the protein coating operation is completed and while the nuts are still present in the coating drum employed for the edible protein coating operation.

In a particular embodiment, which is employed advantageously when the process of the invention is being operated on a continuous basis, the coating operations are carried out sequentially in a single coating drum which is inclined and/or provided with means such as a helical auger for advancing the nuts along the length of the drum as the drum is rotated. The first edible protein coating is applied to the nuts in a first section of such a device and after the nuts have been uniformly coated, the second edible protein coating (when employed) is introduced in a second section of the device, and, thereafter the seasoning mix introduced in a third section. The residence time of the nuts in such a coating device is adjusted, advantageously by adjusting the speed of rotation of the drum or its angle to the horizontal, so as to provide adequate time for each coating to be accomplished uniformly and completely.

The seasoning mix to be coated on the nuts may be of any composition suitable for providing the nuts with the flavor desired. Preferably, though not necessarily, the seasoning mix comprises salt, starch and sugar. The starch used in the seasoning mix is advantageously corn starch. Monosodium glutamate is also often included in the seasoning mix as a flavor enhancer. Preferably, the seasoning mix is also comprised of an additional flavor enhancer comprising a spice mix to provide the desired flavor to the nuts. A suitable spice mix may include gelatin, yeast, dried corn syrup, allspice, cinnamon, clove, carroway, bay, sage, ginger, basil, paprika and other spices, natural flavor, garlic powder and onion powder, in any suitable combination.

Indeed, because the seasoning mix is applied subsequent to roasting, the spice mix can also comprise heat-sensitive materials such as tomato powder, sour cream powder, cheese powders, e.g., cheddar, romano, bleu, and parmesan powders. Additionally, although the amount of reclaim, that is material shed from the nuts as a result of the coating process, generated by this process is greatly reduced, some coating loss is unavoidable. The reclaim which is generated may be combined with the fines, screened and ground and added to the seasoning mix. The seasoning mix is prepared by combining in admixture the desired ingredients.

Preferably, the seasoning mix is applied to the nuts at a rate of about 3 to about 7 parts by weight of seasoning mix per 100 parts by weight of nuts.

The nuts prepared in accordance with the process of the invention are characterized by: improved overall appearance, especially coating uniformity; improved flavor; and improved physical characteristics, including reduced clumping or sticking, and enhanced coating adhesion. In addition, because heat-sensitive seasonings can be used in the inventive process, the nuts prepared can have a flavor not previously thought available.

The flowsheet shown in the FIGURE illustrates a continuous process for roasting nuts in a roaster in accordance with the invention.

In the first step of this process, the nuts are conveyed, by continuous belt conveyor or like means to the ROASTING ZONE wherein the nuts are subjected to roasting in an edible oil such as peanut oil for a predetermined period of time and at a temperature in the range of about 300° F. to about 330° F. As discussed above, the precise range of temperature employed in any given instance depends upon the particular nut being treated. The apparatus employed in any given instance also depends upon the particular nut being treated. The apparatus employed in the ROASTING ZONE can be any of the oil roasting devices known in the art which are capable of operation on a continuous basis. Such devices generally comprises a continuous wire mesh conveyor on to which the nuts are dispensed in a continuous stream and which then conveys the nuts through a bath containing the edible oil maintained at the desired temperature. The rate at which the conveyor moves continuously through the bath is adjusted so that the desired residence time of the nuts in the oil bath is achieved. In general the residence time can vary within the range of about 1.5 to about 7 minutes depending upon the particular type of nut being treated. Illustratively, the longer residence times within the above range are appropriate when peanuts are being subjected to the process of the invention whereas the shorter residence times are appropriate for cashew nuts.

In a particular embodiment, the roasted nuts emerging from the ROASTING ZONE remain on the wire mesh conveyor belt, while the latter is still in motion, for a short period of time, advantageously about 0.5 to about 2.0 minutes, to allow excess oil to drain from the nuts prior to the point at which the nuts are discharged onto the continuous belt conveyor for transfer to the COATING ZONE.

In an optional, but desirable, additional stage of the process, the continuous flow of roasted nuts emerging from the roasting zone is then discharged onto a continuous belt conveyor or like conveying means and transferred to a COOLING ZONE in which the temperature of the nuts is reduced rapidly, illustratively within a period of about 5 minutes and preferably less than about 2 minutes, to a temperature below about 100° F. This operation serves to ensure that excessive roasting of the nuts, because of maintenance of the higher temperatures at which the nuts emerge from the previous step, does not occur. This latter zone advantageously comprises a closed or partially closed area through which air or inert gas, at temperatures of about 100° F. or less, is caused to flow at a rate sufficient to achieve the desired reduction in temperature of the nuts. The efficiency of this cooling step is greatly enhanced by transporting the nuts through the COOLING ZONE on a conveyor belt which is perforated to permit passage therethrough of cooling air or inert gas. A particularly preferred embodiment employs a continuous wire mesh belt conveyor permitting maximum contact between cooling gas and the nuts.

In a feature of the continuous process of the invention, the nuts are agitated by a horizontal mechanical mixer as they are being transferred from the ROASTING ZONE to the COOLING ZONE or within the COOLING ZONE. This operation is designed to effect separation or singularization of the individual nuts. This can be achieved in any convenient manner, such as by employing an oscillating belt conveyor or by operating the belt conveyor, onto which the flow of nuts is discharged from the ROASTING ZONE, at a faster speed than the stream of nuts is moving as it exits that zone. The sudden acceleration in rate of movement of the nuts serves to achieve the desired separation.

In the next step of this process, the roasted nuts and the edible protein, as described above, are conveyed by appropriate means from storage facilities (not shown) and are introduced continuously and in the desired proportions, as discussed above, to the COATING ZONE via an entry port in the first section (A). The COATING ZONE comprises any mechanical continuous coating means commonly employed in the coating art. Illustrative of such apparatus are revolving coating drums in which the nuts are caused to tumble to provide even distribution of the coating over the surface of the roasted nuts. Advantageously, the coating apparatus takes the form of a cylindrical coating drum mounted with its longitudinal axis aligned at a slight angle to the horizontal with the entry port at the elevated end and adapted to rotate at a rate effective to impart a tumbling action to the nuts and to cause the nuts to be propelled towards the exit port of the device.

Alternatively, the coating apparatus employed in the COATING ZONE may comprise an open trough having a semicircular cross-section which is provided with agitating and propulsion means such as a rotating helical auger for imparting the tumbling action necessary to ensure uniform coating to the nuts and, at the same time, for causing the nuts to be conveyed at a rate along the length of the COATING ZONE which ensures pickup of the proper amount of coating in the proper consistency.

The combined mix of the nuts and the first edible protein is tumbled as it is advanced through the zone, typically for less than one minute, e.g., about 15 seconds, prior to application of the second edible protein coating (when employed), to achieve a uniformly complete coating of the first protein on the individual nuts.

The second edible protein and the nuts are blended, by continuing to tumble and advance the nuts, to achieve a uniform coating of the protein solution on the nuts. This coating step can be accomplished preferably in a later section (B) of the same coating apparatus as that employed in the continuous application of the first edible protein. Alternatively, the continuous application of the second protein can be performed in a separate coating apparatus to which the stream of coated nuts is conveyed by means such as a continuous conveyor belt or the like. When such a separate coating apparatus is employed, it can take the form of any of the apparatus described and exemplified in reference to the other coating procedures. Tumbling is continued until the coating(s) provide a surface tackiness effective to pick up and hold the seasoning mix coating. This will typically be achieved in less than one minute of tumbling, e.g., about 30 seconds.

The stream of coated nuts next encounters a continuous stream of seasoning mix coating of the composition described above which is introduced into the COATING ZONE at a rate which is adjusted to provide the desired proportion of seasoning mix to nuts in the ranges discussed above. This coating step can be accomplished preferably in a later section (C) of the same coating apparatus as that employed in the continuous application of the edible protein(s). Alternatively, the continuous application of the seasoning mix can be performed in a separate coating apparatus to which the stream of coated nuts is conveyed by means such as a continuous conveyor belt or the like. When such a separate coating apparatus is employed, it can take the form of any of the apparatus described and exemplified in reference to the other coating procedures.

The rate of continuous passage of the nuts through the second and third coating sections (B) and (C), whether these sections form part of the same coating apparatus as section (A) or are separate coating apparatus, is adjusted so as to permit the uniform application of a coating of the edible protein(s) and seasoning mix, respectively, to the nuts prior to removal of the coated nuts from the coating zone. Advantageously, the rate of passage of the nuts is adjusted so that the total residence time of the nuts in sections (A), (B) and (C) will be less than about 5 minutes, and preferably from about 0.5 to about 2 minutes.

The stream of roasted nuts emerging from the COATING ZONE is then collected and transported by any appropriate means to a packaging station (not shown) where packaging of the nuts by any appropriate and conventional means is accomplished or into an appropriate storage facility. When the nuts are coated with a protein solution as discussed hereinabove, they may have excess moisture on them after coating. In such situations, it may be desired to dry the nuts (for instance, at temperatures between about 100° F. and 150° F.) to remove the excess moisture prior to packaging.

The following non-limiting Examples illustrate a process for the continuous production of coated, roasted peanuts in accordance with the embodiment shown in the FIGURE and discussed above. Unless otherwise indicated, all parts and percentages are by weight.

EXAMPLE I

A gelatin solution is prepared from the following ingredients and proportions (all parts by weight):

|  | Parts |
| --- | --- |
| Gelatin | 7 |
| Water | 93 |

The gelatin is mixed into heated water to obtain a gelatin solution which is transferred to a heated holding tank.

EXAMPLE II

Blanched peanuts (Jumbo Runners) are roasted in refined peanut oil maintained at a temperature of 320° F. The average residence time of the nuts in the hot oil is approximately 4.75 minutes and, after emerging from the hot oil, the nuts are permitted to drain for approximately 45 seconds and then cooled. 250 grams of the roasted nuts are tumbled with 1.5 grams of modified soy protein (commercially available as Versa-Whip ™ whipping protein from A. E. Staley Mfg. Co. of Decatur, Ill.) to coat the nuts with a uniform coating of the protein. The nuts are then coated with 8.75 grams of the gelatin solution of Example I. The protein and gelatin coated nuts are coated with 20 grams of a seasoning mix prepared by intimate blending of the following ingredients in the indicated ratios: salt (flour), about 4: corn starch, about 2: flavor enhancers, about 1.5: sugar, about 1.5: fines and reclaimed coating (screened and ground), about 1.

The resulting roasted nuts are weighed and it is determined that 18.28 grams of the seasoning mix remain on the nuts.

EXAMPLE III

Blanched peanuts (Jumbo Runners) are roasted in refined peanut oil maintained at a temperature of 320° F. The average residence time of the nuts in the hot oil is approximately 4.75 minutes and, after emerging from the hot oil, the nuts are permitted to drain for approximately 45 seconds and then cooled. 250 grams of the roasted nuts are tumbled with 1.5 grams of dry gelatin to coat the nuts with a uniform coating of the gelatin. The nuts are then coated with 8.75 grams of the gelatin solution of Example I. The gelatin coated nuts are coated with 20 grams of intimate blending of the following ingredients in the indicated ratios: salt (flour), about 4: corn starch, about 2: flavor enhancers, about 1.5: sugar, about 1.5: fines and reclaimed coating (screened and ground), about 1.

The resulting roasted nuts are weighed and it is determined that 19.24 grams of the seasoning mix remain on the nuts.

EXAMPLE IV

Blanched peanuts (Jumbo Runners) are roasted in refined peanut oil maintained at a temperature of 320° F. The average residence time of the nuts in the hot oil is approximately 4.75 minutes and, after emerging from the hot oil, the nuts are permitted to drain for approximately 45 seconds and then cooled. 250 grams of the roasted nuts are tumbled with 2.5 grams of peanut oil to coat the nuts with a uniform coating of the peanut oil. The nuts are then coated with 10 grams of a seasoning mix prepared by intimate blending of the following ingredients in the indicated ratios: salt(flour), about 4: corn starch, about 2: flavor enhancers, about 1.5: sugar, about 1.5: fines and reclaimed coating (screened and ground), about 1.

The resulting roasting nuts are weighed and it is determined that 8.62 grams of the seasoning mix remain on the nuts.

Accordingly, it is apparent that nuts coated in accordance with the present invention (Examples II and III) exhibit greater coating adhesion, and, hence, improved appearance and flavor, than those coated by conventional processes (Example IV).

It is to be understood that the above Examples are given by way of illustration only and are not to be construed as limiting the invention.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for preparing roasted nuts which comprises:
   (a) heating the nuts in an edible oil under conditions effective to impart a roasted nut color, flavor and aroma;
   (b) applying edible protein in dry form to the surface of the roasted nuts to obtain a uniform coating of edible protein on the roasted nuts;
   (c) applying about 2% to about 7% by weight of water to said edible protein-coated nuts to produce a surface to which a subsequently applied seasoning mix will adhere; and
   (d) applying a seasoning mix to the protein-coated nuts under conditions effective to obtain a coating of seasoning mix on the nuts.

2. The process of claim 1 wherein said nuts are heated in an oil roaster at a temperature of about 240° F. to about 350° F.

3. The process of claim 1 wherein said edible protein is applied at a rate of about 2.0 to about 4.5 parts by weight of protein per 100 parts by weight of nuts.

4. The process of claim 3 wherein said edible protein is a legume or animal-derived proteinaceous material.

5. The process of claim 3 wherein said edible protein is selected from the group consisting of egg albumin, soy protein, modified soy protein, gelatin and mixtures thereof.

6. The process of claim 3 wherein said edible protein is applied in dry form and the nuts are sprayed with a minor amount of water.

7. The process of claim 3 wherein said nuts are coated with a second coating of an edible protein.

8. The process of claim 1 wherein said seasoning mix is applied at a rate of about 3 to about 7 parts by weight of seasoning mix per 100 parts by weight of nuts.

9. The process of claim 8 wherein said seasoning mix comprises salt, starch and sugar.

10. The process of claim 9 wherein said seasoning mix further comprises ingredients selected from the group consisting of monosodium glutamate, yeast, gelatin, dried corn syrup, allspice, cinnamon, clove, carraway, bay, sage, ginger, basil, paprika, garlic powder, onion powder, tomato powder, sour cream powder, cheese powder, and mixtures thereof.

11. The process of claim 1, wherein the application of water is accomplished by applying a coating of an edible protein in aqueous solution to the nuts.

12. The roasted nut prepared in accordance with the process of claim 1.

13. A process for preparing roasted nuts which comprises:
(a) continuously conveying raw nuts through a heating zone in which the nuts are roasted in an edible oil at a temperature of from about 240° F. to about 350° F.;
(b) continuously feeding the roasted nuts through a coating zone;
(c) applying a first uniform coating of an edible protein in dry form to the nuts during passage through a first section of said coating zone;
(d) applying about 2% to about 7% by weight of water to the nuts during passage through a second section of said coating zone; and
(e) Applying a coating of a seasoning mix during passage through a third section of said coating zone.

14. The process of claim 13 which further comprises continuously conveying the roasted nuts through a cooling zone.

15. The process of claim 13 wherein said seasoning mix comprises salt, starch and sugar.

16. The process of claim 15 wherein said seasoning mix further comprises ingredients selected from the group consisting of monosodium glutamate, yeast, gelatin, dried corn syrup, allspice, cinnamon, clove, carraway, bay, sage, ginger, basil, paprika, garlic powder, onion powder, tomato powder, sour cream powder, cheese powder, and mixtures thereof.

17. The process of claim 16 wherein said seasoning mix is applied at a rate of about 3 to about 7 parts by weight of seasoning mix per 100 parts by weight of nuts.

18. A roasted nut prepared in accordance with the process of claim 17.

19. A roasted nut prepared in accordance with the process of claim 13.

20. The process of claim 13, wherein the application of water is accomplished by applying a coating of an edible protein in aqueous solution to the nuts.

21. The process of claim 20 wherein said solution comprises about 6% to about 8% edible protein.

* * * * *